Figure 1:
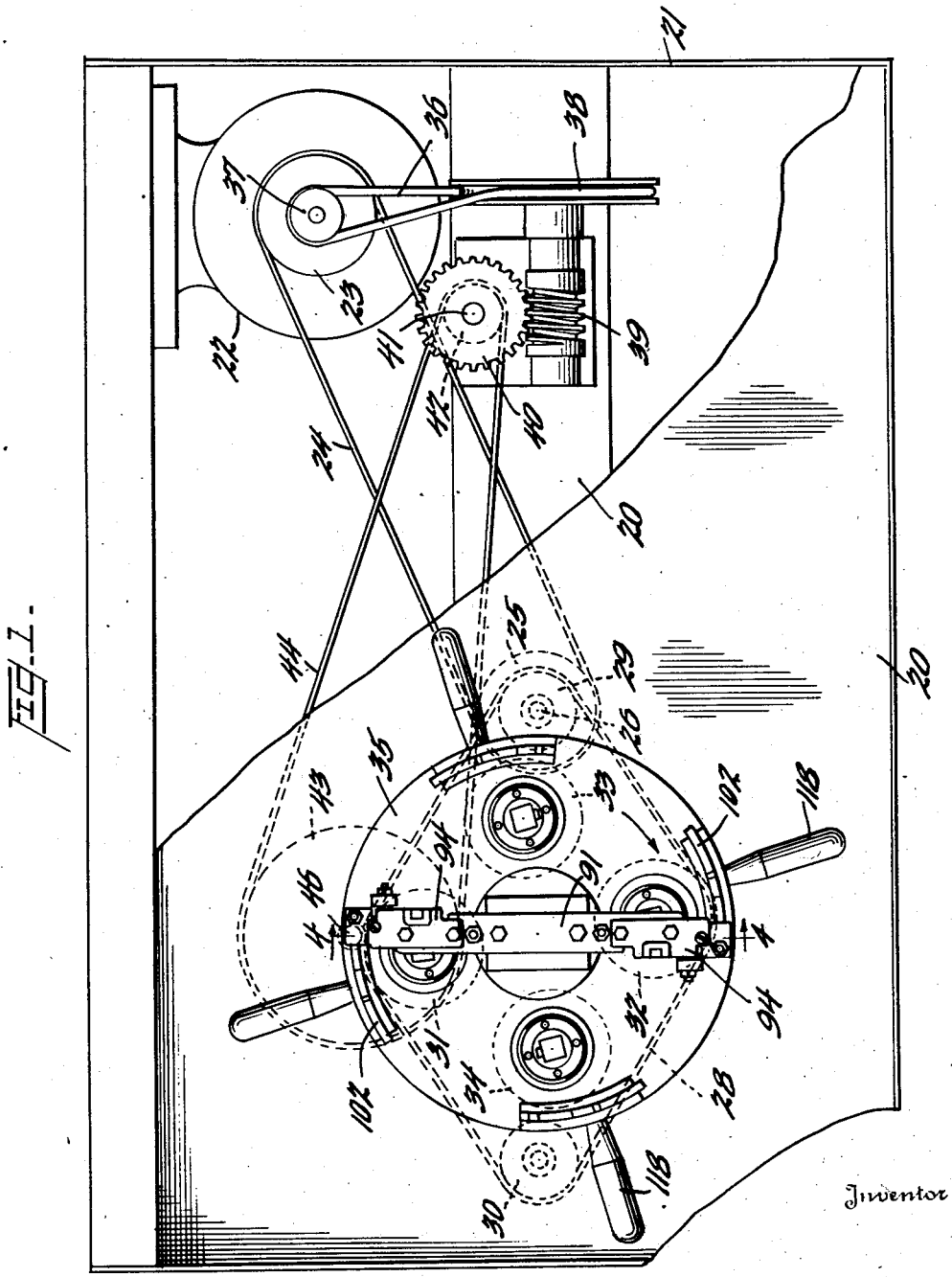

Feb. 6, 1945. C. N. RAIBOURN 2,368,614
METAL WORKING MACHINE
Filed Nov. 9, 1942 5 Sheets-Sheet 1

Inventor
Charles N. Raibourn
By
*[signature]*, Attorney

Feb. 6, 1945.  C. N. RAIBOURN  2,368,614
METAL WORKING MACHINE
Filed Nov. 9, 1942  5 Sheets-Sheet 2

Inventor
Charles N. Raibourn
By
Attorney

Feb. 6, 1945. C. N. RAIBOURN 2,368,614
METAL WORKING MACHINE
Filed Nov. 9, 1942 5 Sheets-Sheet 3
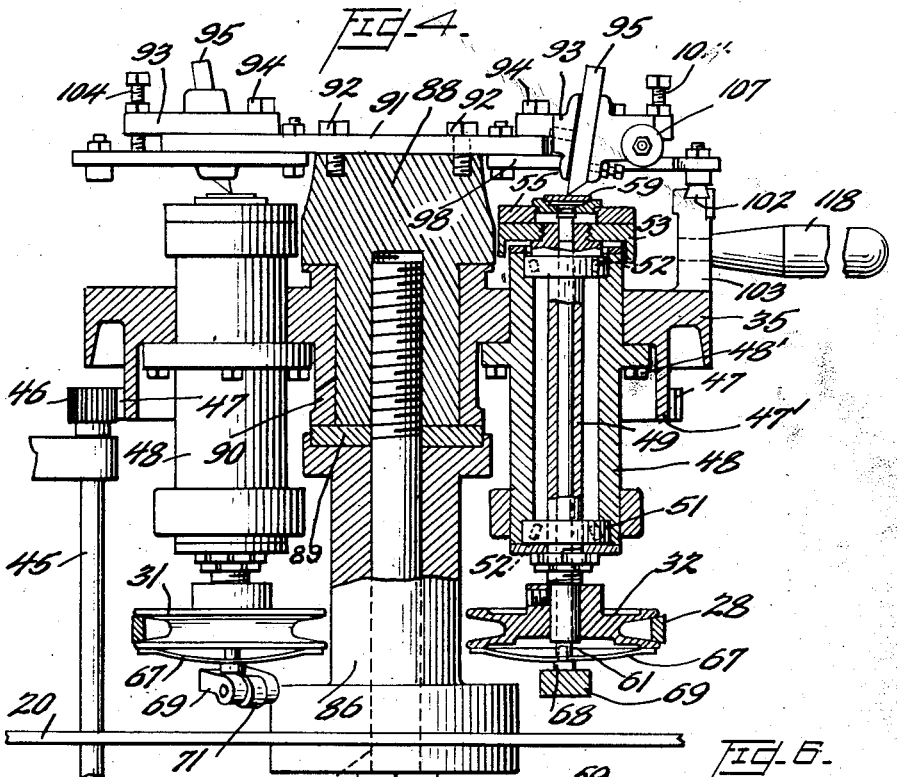
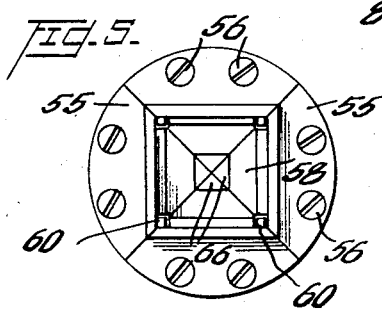
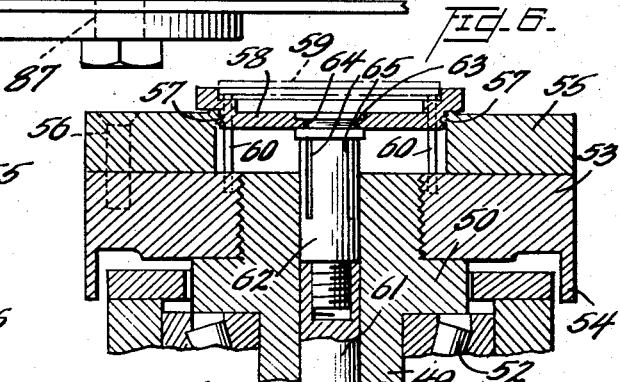
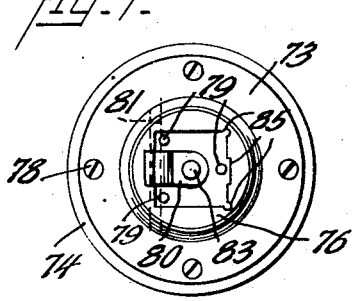
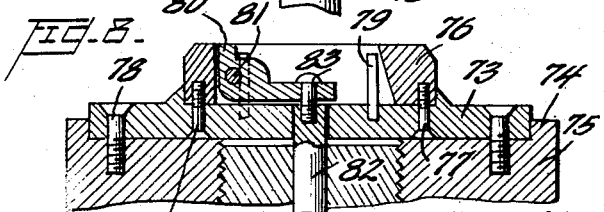
Inventor
Charles N. Raibourn,
By ........, Attorney

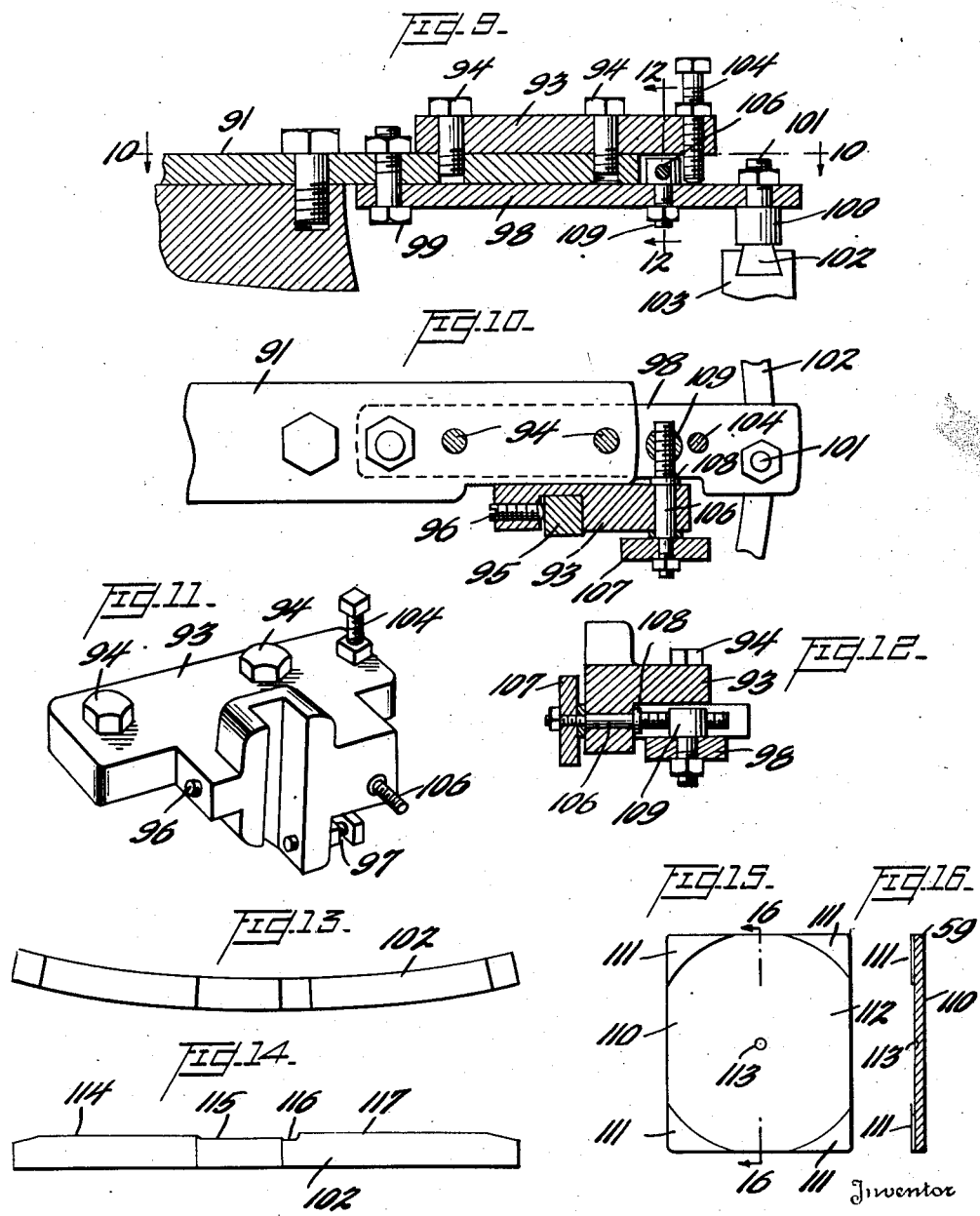

Feb. 6, 1945. C. N. RAIBOURN 2,368,614
METAL WORKING MACHINE
Filed Nov. 9, 1942 5 Sheets-Sheet 5

Inventor
Charles N. Raibourn
By
F. W. Dahn,
Attorney

Patented Feb. 6, 1945

2,368,614

UNITED STATES PATENT OFFICE 2,368,614

METALWORKING MACHINE

Charles N. Raibourn, Washington, D. C.

Application November 9, 1942, Serial No. 465,057

17 Claims. (Cl. 82—3)

My invention relates to metal working machines and specifically to a machine for forming smooth surfaces on small metal plates such as electrodes used in piezo-electric frequency control devices.

It is an object of my invention to form such surfaces while avoiding any danger of warping of the plates so finished either during or after the operation thereon.

Another object is to provide means for so finishing the surface in question while safeguarding the plate against any possibility of high center at the center of the plate.

Another object is to provide for very accurate and minute adjustment of the cutting means herein described, so as to make the depth of cut very accurate and to be able to vary the depth by very minute increments.

Another object is to greatly increase the production of such plates over previously known apparatus for the same purpose.

Another object is to provide improved workholding means for such plates.

Figure 2:
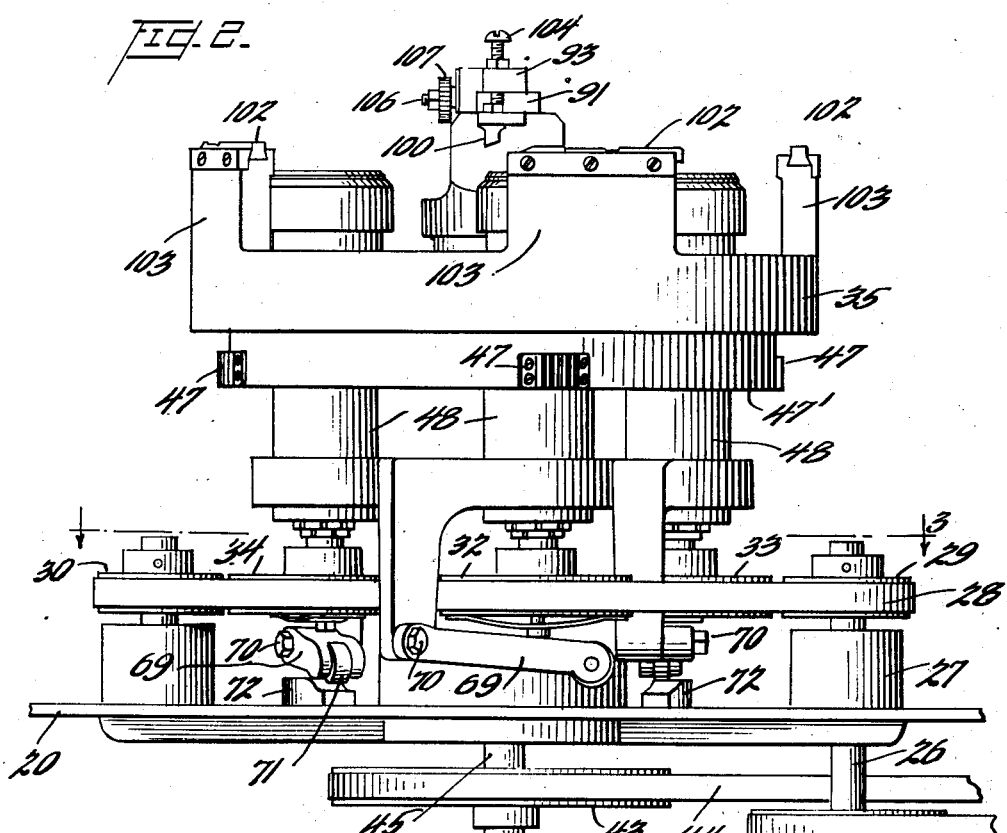
Figure 3:
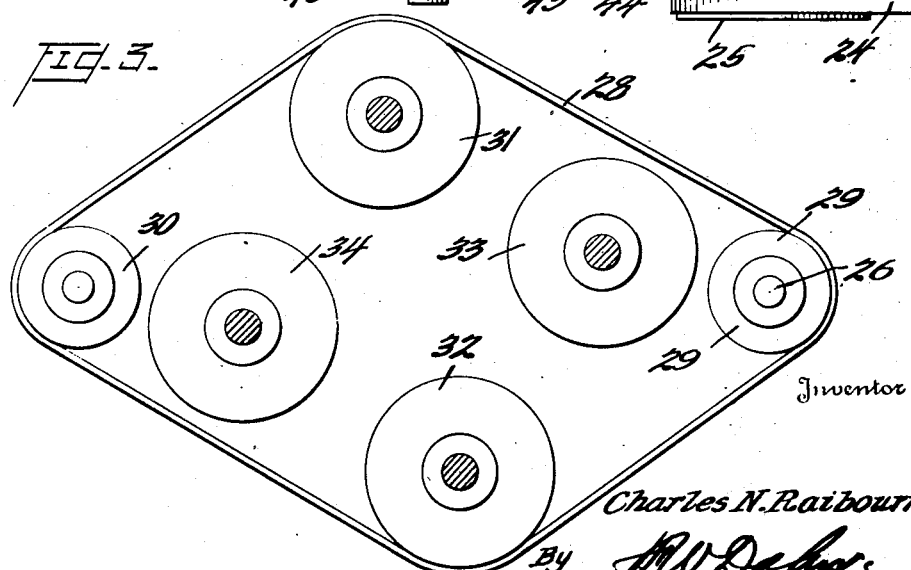

Referring to the annexed drawings, which are made a part of this application and in which similar parts are indicated by similar reference characters:

Fig. 1 is a top plan of the machine of my invention,

Fig. 2, a front elevation,

Fig. 3, a diagrammatic view of workholder driving means, in section on line 3—3 of Fig. 2, Fig. 4, a section on line 4—4 of Fig. 1, Fig. 5, a top plan of a workholder or chuck forming part of my invention, Fig. 6, a vertical central section of the same, Fig. 7, a top plan of a modified chuck, Fig. 8, a vertical central section of the same.

Figure 17:
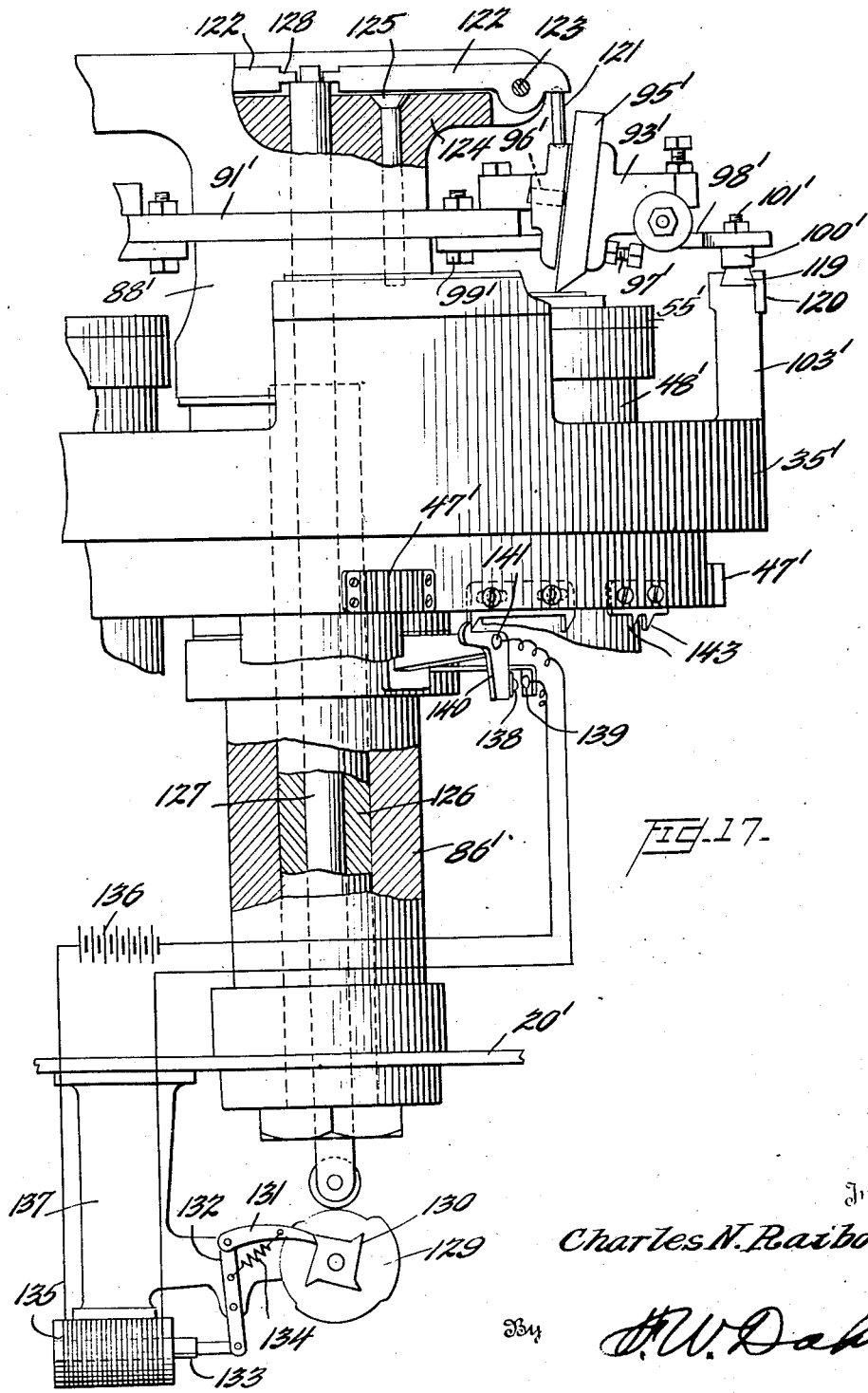

Fig. 9, a vertical section of a toolholder forming part of the machine of my invention, and means for supporting the same, Fig. 10, a top plan of the toolholder and support, on line 10—10 of Fig. 9, partly in section, Fig. 11, a perspective view of the toolholder per se, Fig. 12, a section on line 12—12 of Fig. 9, Fig. 13, a top plan of a cam forming part of my invention, Fig. 14, an elevation of the same, Fig. 15, a top plan of a plate that has been treated by the machine of my invention, Fig. 16, a section on line 16—16 of Fig. 15, and Fig. 17, an elevation of a modified form of my machine, with parts in section.

In the drawings, reference character 20 indicates a base plate forming the support for various parts of my machine, this plate being preferably provided with upstanding marginal portions 21 as indicated in Fig. 1, so as to provide a receptacle for oil and grease thrown off the parts above base plate 20.

A motor 22 beneath the base plate is connected by pulleys 23 and 25 and a belt 24 to a shaft 26 that is journaled in a bearing 27 on plate 20 and which drives belt gearing including a belt 28 and pulleys 29 and 30, said belt being adapted to drive either the pulleys 31, 32 or pulleys 33, 34, of rotary workholders hereinafter described, when either of said pairs of pulleys is positioned to engage said belt.

Motor 22 is connected to a turret 35, for rotating the same at greatly reduced speed, by means including a belt 36 trained about pulleys 37, 38, the pulley 38 being fast to a shaft carrying a worm 39 which drives a worm wheel 40 on a shaft 41 connected by pulleys 42, 43 and a belt 44 to a shaft 45 (Fig. 4), said shaft being provided with a pinion 46 for rotating the turret when any one of a plurality of racks 47 arranged in spaced relation about the depending skirt 47' of the turret is in position to be engaged by said pinion. In the machine illustrated there are four such racks, there being one for each of the four workholders, but only three of the racks are shown in the drawings.

The turret 35 is provided, as stated, with four rotary workholders each of which is journaled in a sleeve 48 secured to the body of the turret, preferably by bolts shown at 48', the workholders each including a hollow shaft 49 with upper and lower integral collars 50, 51 journaled above and below by suitable radial-thrust bearings 52 (Fig. 6) which act as combined journal and end thrust bearings. On the lower end of each workholder is one of the driving pulleys 31 to 34. Above the upper shoulder a head is secured to each shaft 49, said head consisting of a chuck plate in the form of a plate 53 threaded on the sleeve, this plate having a depending mantle 54 to cover the bearings enclosed thereby.

A chuck body 55 is fixed to the plate 53 as by means of screws 56, this body conveniently comprising four sectors, as shown in Fig. 5, for ready assembly. The parts of the chuck body are shaped so as to leave a square hole in the head and each segment has near its upper end an inwardly extending bead at 57, providing a pivot on which one of the four chuck jaws 58 may rock.

The enclosed position of the chuck is shown in Fig. 6, where the jaws hold a square metal plate 59 (commonly, in the work now being done, of about the size of the jaw openings shown in Fig. 5, though I do not limit myself to any specific size of work). The lowermost position of the plate 59 is determined by gauge pins 60, 60 set into the chuck plate 53 and extending upward to a level just below the extreme top of the chuck jaws at the corners of the opening in body 55, i. e., between the extreme outer corners of the jaws.

The chuck is opened by moving the jaws upward about their pivots, only a slight movement being required for this purpose. To this end a rod 61 is mounted in the hollow shaft for endwise reciprocation through said shaft, said rod being provided at its upper end with a detachable part 62 that is or may be square in cross section, and carries at its upper end a square head 63 having a slot at each side for engaging the reduced inner lip 64 of the adjacent jaw. The head 63 and the end of part 62 have intersecting saw cuts 65 dividing the same into quarters 66 (Fig. 5) corresponding to the lip portions of the respective segmental jaws 58.

The rods 61 are normally held in their lowermost or chuck-closing position by means of leaf springs 67 which may be secured at opposite ends to the driving pulleys 31—34 of the workholders. Each spring 67 is provided midway between its ends with a hole to receive a screw 68 that extends through the hole and fastens spring 67 to rod 61. Each rod 61 is lifted by a lever 69 pivoted at 70 and provided at its free end with a follower 71 adapted to ride on cams 72 secured to the base plate 20 in position to elevate the rods 61 and open the chucks that are in idle position as at the right and left sides of Figs. 1 and 2. The working position of the chucks is illustrated in Fig. 4 and at the middle of Figs. 1 and 2, where there is no cam to raise lever 69 and hence they are held down by the action of springs 67, though the movement is of very limited extent from open position to closed position of the chuck.

In the modified form of the chuck (Figs. 7 and 8) the parts are generally similar in construction and operation to those above described except as now to be indicated. The chuck body 73 is an integral circular plate fitting in an annular flange 74 in a chuck plate 75 forming part of the head of the workholder, and said plate has an annular flange to receive a chuck jaw 76 fixed to plate 73 by screws 77, the plate being likewise fixed to plate 75 by screws 78. Within the jaw are three upright pins 79 upon which the work rests and by which it is located very exactly in place during the finishing operation.

The jaw 76 fits closely at opposite sides of the work (e. g., at top and bottom in Fig. 7) and a movable jaw 80 serves to clamp the work between it and the opposed face on jaw 76. Jaw 80 is formed as a bent lever pivoted at 81 on the fixed jaw and connected to the vertically slidable rod 82 by a screw 83. The fixed jaw is preferably slightly relieved, as indicated at 85, so as to permit a blank to be gripped firmly even though it may have slight irregularities at certain points which would otherwise have to fit exactly against the face of the fixed jaw.

The tool-holding devices are fixed in place and comprise a central post including a lower post member 86 fixed to the base plate 20, as by a bolt 87 extending through said parts and threaded into an upper post member 88. The post members are separated by a fiber washer 89 resting in a recess in lower member 86 and clamped between said post members by the bolt 87, and the turret 35 rotates about the upper post member 88 and rests on said fiber washer 89, the skirt 47' and the central sleeve 90 of the turret serving as a housing to protect the workholders but permitting speedy assembly or taking apart of the mechanism by withdrawal of bolt 87.

A long, narrow, flat bar 91 is fixed upon the post member 88 by screws 92, and this bar carries at each side a toolholder 93 (Fig. 11) fixed to the bar by screw bolts 94. The toolholder has a recess to receive a metal cutting tool 95 which tool is clamped in place by screws 96 and 97 (Figs. 10 and 11).

The toolholder 93 is adjustable with relation to the work by means including a plate 98 pivotally fixed to the bar 91 by a screw 99. Each plate 98 carries at its outer end a follower 100 on a bolt 101, said followers cooperating with cams 102 mounted on upwardly extending flanges 103 of the turret. By means of a settable screw bolt 104 on the toolholder the plate 98 can be sprung or tilted downward more or less with relation to bar 91. When the follower 100 rides on a cam 102 it can spring the bar 91 upward more or less (of course to a very minute extent) and so vary the elevation of the tool with respect to the work blank.

Another adjustment for varying the point at which the tool is positioned to engage the work includes the plate 98 and its pivot 99, together with a screw 106 having a knurled head 107. The screw 106 is fixed against endwise movement in a hole in the toolholder, by means of a shoulder 108, and the threaded portion of the screw engages a threaded opening in the enlarged head of a screw 109. It will be evident that rotation of screw 106 will adjust the plate 98 about its pivot at 99 and so vary the point of incidence of the follower and its cam 102.

While the work to be done is not intended to be limited in any way by disclosure in this application, Figs. 15 and 16 have been added as showing a type of work for which the mechanism was originally designed. In this operation small square or rectangular blanks 110 about one-half inch square and one-sixteenth inch thick, such as used for electrodes in piezo-electric frequency-control devices, are to have one face reduced slightly at the corners 111, and somewhat more over the balance of the face 112, the reduction in thickness being measured in fractions of a thousandth of an inch and it being highly essential that the machined surfaces be absolutely flat and uniform. Preferably, in order to avoid any possible upstanding burr or point at the center, I reduce the thickness of the plate still farther at this point, as shown at 113.

To control the operation of the cutter 95 for machining blanks as above set forth, the cams 102 are made as best shown in Fig. 14, with a relatively high level at 114 to permit the cutter to machine the rotating blank at the corners 111 as the cutter is slowly traversed by the turret driving means 46, 47 (Fig. 4). When the follower reaches the end of level 114 the cutter is permitted to descend to a lower level 115, and so to take a deeper cut while traversing that level and machining the face 112. When that is completed the cutter is near the center of the blank and the follower then descends to level 116, permitting the cutter to descend farther and cut deeper at 113, so as to eliminate any possible central burr. Then the follower rides up on face 117 which is high enough to raise the cutter completely out of contact with the work, and rotation of the turret by pinion 46 and rack 47 continues sufficiently to move the work beyond reach of the cutter. Obviously the relative lengths and heights of the faces or levels on the cams 102 may be varied according to the needs of the work, as to its size and as to the number and relative heights of the faces to be made thereon. Suitable handles 118 are provided on the turret for rotating the same normally through the intervals between racks 47.

In the operation of my machine in the form so far described, blanks are located in the chucks of the idle units, i. e., those corresponding to pulleys 33 and 34 in Fig. 1, these chucks being now held open against the tension of their springs 67, by means of levers 69 and cams 72. When the turret has been rotated, by means of pinion 46 and a rack 47, as far as it can be driven by the same, it becomes stationary. The operator now grasps handles 118 and rotates the turret far enough to engage the next rack 47 with pinion 46. In so doing he also moves the pulleys 31 and 32 away from belt 28 into the idle position of pulleys 33, 34 in Fig. 3, and brings pulleys 33 and 34 into operative relation to said belt, i. e., into the position of pulleys 31 and 32 in Fig. 4. Now the levers 69 have ridden off the cams 72 and permitted the chucks to close; the workholders are rotating, and so cutting begins at the corners of the blank and continues as above described. While the newly-placed blanks are being machined the operator removes those just finished, their chucks having been opened by the levers 69 riding upon the cams 72, and places other unmachined blanks in the chuck, after which the cycle of operations continues as described. As illustrative of the capacities of the machine, the first level 114 of cam 102 may be such as to cause the tool to reduce the thickness of the blank 0.005 inch at the corners 111, the following face at 115 may permit the tool to drop so as to reduce the part 112 by another 0.001± inch, the face at 116 may permit the tool to drop so as to reduce the central part of 115 by another 0.001± inch and the face 117 is so high as to lift the tool 0.015 inch or more, so as to clear all parts of the blank 59. Suitable proportions in length for the faces of cam 102 may be three-fourths inch for face 114; one-half inch for face 115, one-quarter inch for face 116, and one and one-half inches for face 117. But obviously all such dimensions are relative and may be varied according to the size of the blank, the depth of cuts desired, and other conditions of the work.

In the modified form of the invention shown in Fig. 17, the parts shown at 20', 35', 47', 48', 55', 86', 88', 91', 95', 96', 97', 98', 99', 100', 101', 103', and other parts not specifically indicated by reference characters, are or may be identical with parts shown in the form previously described. In this form of the invention the track cam 102 is replaced by a flat-topped member 119 which serves merely as a guide and steady rest for follower 100' and which does not vary the height of the cutter 95'. It may be noted that the cam 119, like cam 102, is held on the turret by a removable segmental piece 120 fixed to the turret by screws or the like (not shown).

For varying the heights of the cutters with reference to the work I have provided an upright pin 121 for each cutter which may have its respective ends set into recesses in the toolholder 93' and a lever 122 pivoted at 123 on a crown piece 124 above the bar 91' and fixed to the upper post member 88' as by screws, one of which is shown at 125. Instead of the solid screw bolt 87 of Fig. 4, the post members in Fig. 17 are secured together by a hollow screw bolt 126. An upright rod 127 passes through said bolt 126 and through the center post and crown piece, this rod being reduced at its upper end to provide an annular shoulder for engagement with the reduced inner ends 128 of levers 122.

At the lower end of rod 127 I provide a cam 129, here shown as being rotary and as having four faces at different distances from its center of rotation. These faces may bear the same relation to each other in respect of length and height (or distance from the center of rotation) as the faces of cam 102, and serve the same purpose, in that they elevate rod 127 more or less and so, through the medium of levers 122 and pins 121, spring the bar 91' and/or plate 98' to a greater or less degree so as to bring the toolholder and tool into position to cut a blank down accordingly. For the purpose of rotating the cam 129 I provide a ratchet 130, fixed to the cam or to its shaft and having one tooth for each cam face, so located as to bring that face into operative position. The ratchet is turned by a pawl 131 on a lever 132 which lever is moved by an armature 133 in a direction to rotate the disc cam positively and is retracted by a spring 134. The armature is energized by a coil 135 in circuit with a battery 136, all of these parts being shown as carried by a bracket 137 on base plate 20'. The circuit is normally open, but is closed at intervals by means comprising contacts 138, 139 carried by any fixed part, e. g., by post member 86', one of which contacts is located on a circuit closing bent lever 140 pivoted at 141. The lever 140 is operated intermittently during rotation of the turret, by means of lugs 143 depending from the turret, and so located as to change the height of the cutter at appropriate times with relation to the operation of the remaining parts.

It will be obvious to those skilled in the art that many changes may be made in the devices of my invention, all without departing from the spirit of the invention, and therefore I do not limit myself to what is shown in the drawings and described in the specifications but only as indicated in the appended claims.

Having thus fully described my invention, what I claim is:

1. In a metal working machine, a turret, a plurality of chucks spaced about the periphery of said turret, stationary toolholders located at spaced points about said turret, a fixed tool on each toolholder, means for rotating only those chucks that are in operative relation to said toolholders, means for rotating the turret positively through a short arc while the work on a chuck is being traversed past a tool on a toolholder, and manual means whereby the turret may subsequently be rotated to bring another chuck into operative relation to each toolholder and to the chuck driving means.

2. In a metal working machine, a turret manually rotatable through an arc, power means for subsequently rotating the turret through another arc, a workholder on the turret, jaws on the workholder, spring means for closing said jaws, means operative while the workholder is passing the toolholder to rotate the workholder and then permitting the workholder to become stationary, and means for positively opening said jaws when the rotation of the workholder stops.

3. In a metal working machine, a turret manually rotatable through an arc, power means for subsequently rotating the turret through another arc, a plurality of chucks on said turret, spring means for holding said chucks closed, means operative while a chuck is passing a toolholder to rotate the chuck and then permitting the chuck to cease rotation, manual means whereby the turret may be rotated to bring the next chuck into operative position with relation to the toolholder and the chuck driving means, and means for opening the jaws of the idled chuck.

4. The combination of a turret, racks spaced about the periphery of the turret, a pinion positioned to engage said racks in succession, one or more handles on the turret for rotating the same manually to cause the pinion to engage a rack, spindles on the turret adjacent each of the racks, and means for rotating the spindle adjacent an individual rack while the rack is engaged by said pinion.

5. The combination of a turret, segmental racks spaced about the periphery of the turret, a pinion positioned to engage said racks in succession, driving means for the pinion, and one or more handles on the turret for manually rotating the same into position to cause the pinion to engage a rack and rotate the turret.

6. A metal working machine comprising a turret, means for rotating the same, a rotary workholder on the turret, a stationary toolholder, a cutter thereon for operating on the work while the rotating workholder is passing the cutter, and automatic means for varying the depth of cut produced on different parts of the work, including a yieldable support for the cutter, and means extending circumferentially of the turret for acting on said support during a cutting operation to move the cutter and so to vary the depth of the cut.

7. A metal working machine comprising a turret, means for rotating the same, a rotary workholder on the turret, a stationary toolholder, a cutter thereon for operating on the work while the rotating workholder is passing the cutter, and automatic means for varying the depth of cut produced on different parts of the work, including a yieldable support for the cutter, a follower on the support and a cam mounted on the turret to rotate therewith said cam being positioned to engage said follower and having parts differing in height.

8. A metal working machine comprising a turret, means for rotating the same, spindles on the turret, each spindle having a pulley at one end for rotating it, one or more pivoted jaws at the other end of the spindle, a leaf spring extending across said pulley at the side remote from said jaws, a jaw-operating rod extending through said spindle and pulley and spring, and means operable in the rotation of the turret for successively and automatically opening the jaws of different spindles.

9. A metal working machine comprising a turret, means for rotating the same, a rotary workholder on the turret, a stationary toolholder, a cutter thereon for operating on the work while the rotating workholder is passing the cutter, and automatic means for varying the depth of cut produced on different parts of the work, including a cam having portions of different height, means for moving said cam step by step while the work is passing the cutter, a yieldable support for the cutter, and means for causing the different height portions of the cam to depress the cutter correspondingly toward the work and so to vary the depth of cut.

10. A metal working machine comprising a turret, means for rotating the same, a rotary workholder on the turret, a stationary toolholder, a cutter thereon for operating on the work while the rotating workholder is passing the cutter, and automatic means for varying the depth of cut produced on different parts of the work, including a rod extending axially of the turret, a cam below the turret, said cam having portions of different height each adapted to engage said rod, means on the turret for causing the cam to be moved step by step, a resilient support for the cutter, and means for transmitting the movements of said rod to the cutter support for forcing the cutter toward the work to varying extents so as to vary the depth of cut.

11. A metal working machine comprising a turret, means for rotating the same, a rotary workholder on the turret, a stationary toolholder, a cutter thereon for operating on the work while the rotating workholder is passing the cutter, and automatic means for varying the depth of cut produced on different parts of the work, including a resilient cutter support, a rod coaxial with the turret, a rotary cam engaging one end of the rod, means for rotating the cam said means including a pawl, an electromagnet for operating the pawl, a normally open circuit for the pawl, and abutments on the turret for closing the circuit at intervals to cause said pawl to rotate said cam step by step.

12. A metal working machine comprising a turret, means for rotating the same, a rotary workholder on said turret, a stationary toolholder, a stationary tool thereon for operating on the work while the rotating workholder is passing the tool, automatic means for varying the depth of cut on different parts of the work, including a tool support on the toolholder movable toward and from the work, and means operable during the transit of the work past the tool for so moving the tool support.

13. The combination of a turret mounted to rotate on a vertical axis, spaced workholders on said turret, a pulley at the lower end of each workholder, a pair of pulleys on the fixed frame of the machine at opposite sides of the turret, a belt trained about all of said pulleys, the pulleys on said workholders being so arranged that alternate ones may engage the belt and be driven thereby while intermediate ones are out of engagement with the belt, stationary tools adapted to engage the work on each of the rotating workholders, and turret driving means arranged to drive the turret only while a pair of its workholders are being rotated, so as to traverse the work on a workholder past the corresponding tool, after which the rotation of the turret ceases.

14. In a metal working machine, the combination of a turret, a stationary tool adjacent thereto, a workholder on the turret, power means for rotating the turret through an arc, said workholder being so located as to pass the tool while the turret is passing through said arc, means for rotating the workholder while it is passing said tool, manual means whereby the turret may be rotated between power operations, and means for adjusting the tool circumferentially of the turret so as to position it for engagement with the rotating work.

15. The combination of a turret, a turret driving device located adjacent the periphery of the turret, means at spaced intervals about the periphery of the turret for coacting with the turret driving device to rotate the turret, manual means by which the turret may be turned to bring the said coacting means successively into operative relationship with said turret driving device, workholding spindles on the turret adjacent each of said coacting means, and means for driving the spindle adjacent an individual one of said coacting means while the said coacting means is in engagement with said turret driving device.

16. The combination of a turret mounted for rotation, spaced workholders on said turret, a driving pulley for each workholder, a pair of pulleys on the fixed frame of the machine at opposite sides of the turret, a driven belt trained about all of said pulleys, the pulleys on said workholders being so arranged that alternate ones may contact the belt and be rotated thereby while the intermediate ones are stationary, a tool for engaging the work on each rotating workholder, and turret driving means arranged to rotate the turret only while the workholders of a set are being rotated, after which the rotation of the turret ceases.

17. A device as in claim 16, including means whereby the turret may be manually rotated to bring the previously idle pulleys into position to engage the belt for rotating their workholders, while the previously driven ones are idle.

CHARLES N. RAIBOURN.